July 2, 1968  A. C. SCINTA  3,390,416
WINDSHIELD WIPER
Filed June 15, 1946  2 Sheets-Sheet 1
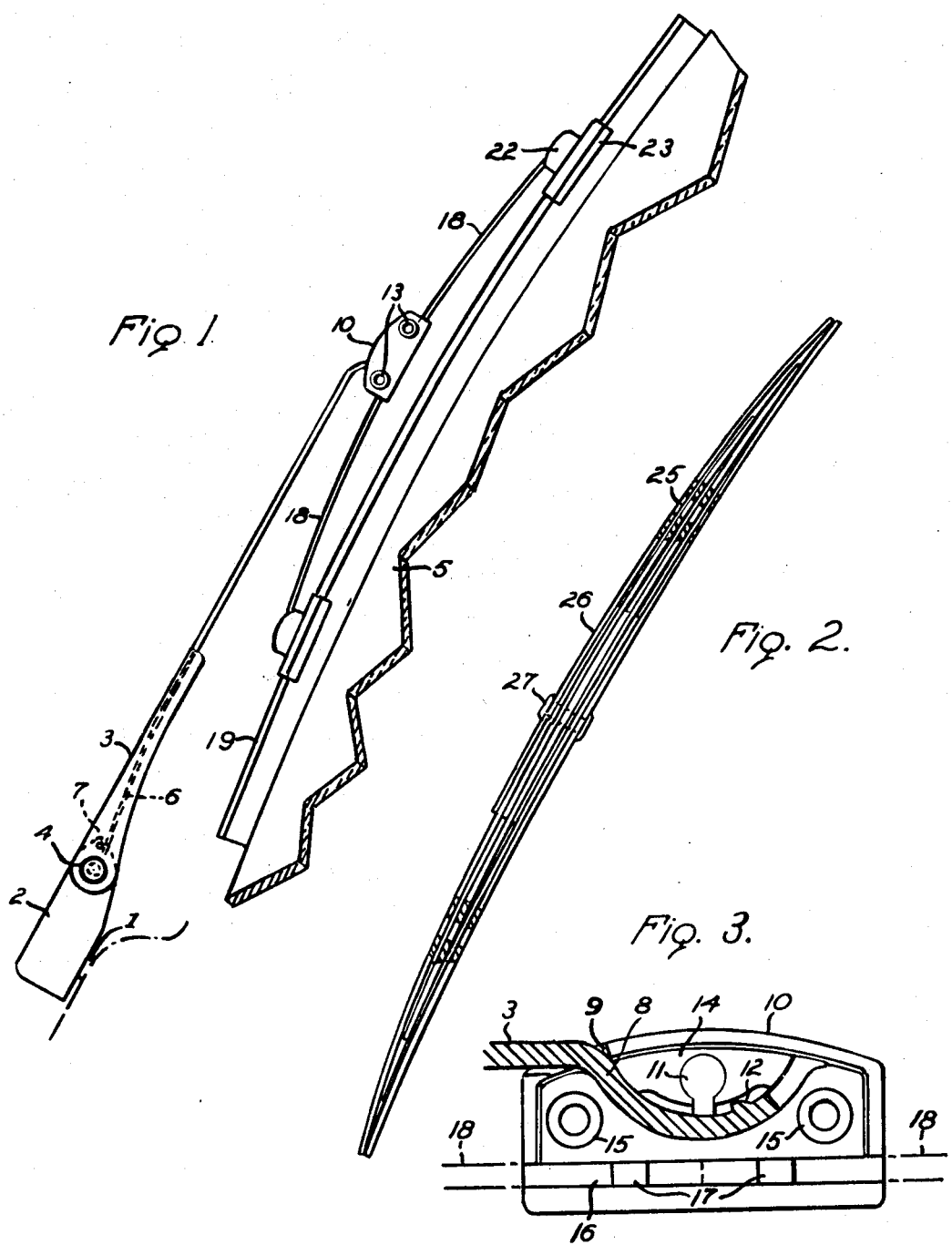
INVENTOR
Anthony C. Scinta
BY
Bean, Brooks, Buckley & Bean
ATTORNEYS July 2, 1968  A. C. SCINTA  3,390,416
WINDSHIELD WIPER
Filed June 15, 1946  2 Sheets-Sheet 2
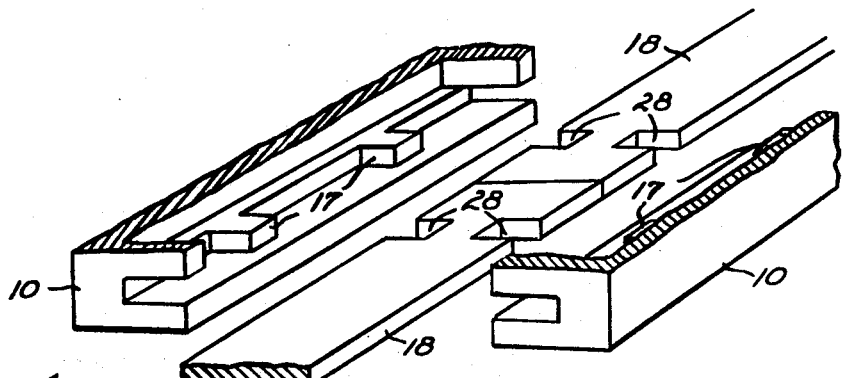
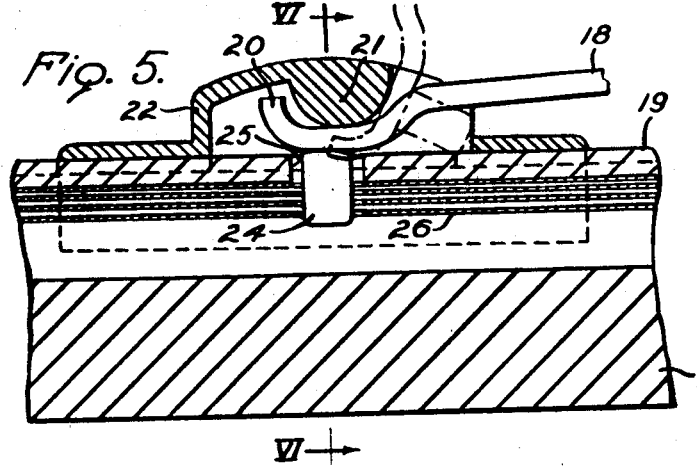
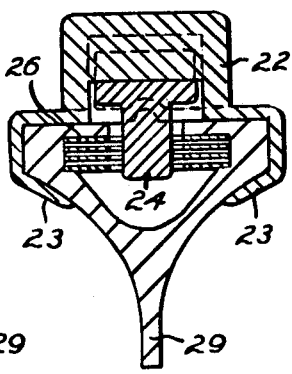
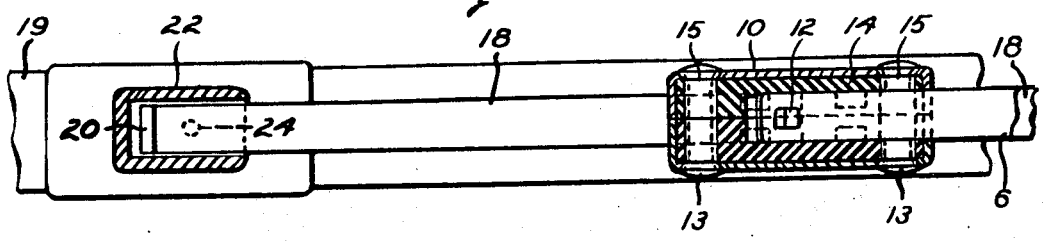
INVENTOR
Anthony C. Scinta
BY
Bean Brooks, Buckley + Bean
ATTORNEYS

3,390,416
WINDSHIELD WIPER
Anthony C. Scinta, Buffalo, N.Y., assignor to Trico Products Corporation, Buffalo, N.Y.
Filed June 15, 1946, Ser. No. 676,974
23 Claims. (Cl. 15—250.42)

This invention relates to a windshield cleaner and has particular reference to a wiper for curved windshields. It has heretofore been proposed to suspend a squeegee at spaced points of support for providing a flexibility in its mounting and thereby enabling a freedom of flexure in the wiping edge to secure more ready conformance to the changes in curvature of the surface being acted upon. Such an arrangement and disclosure is shown in my co-pending application Ser. No. 636,548 filed Dec. 12, 1945.

The primary object of the present invention is to provide an improved wiper construction in which the squeegee and its mounting parts are novelly interlocked into a flexible wiping unit, and further to provide an arrangement of this character which may be economically manufactured.

Another object of the invention is to provide a wiper for curved windshield surfaces which will be practical and efficient in use and of simple and durable construction.

The invention further resides in a windshield wiper mounting of improved design which will enable the squeegee being employed on windshield surfaces of both flat as well as curved contour.

The foregoing and other objects will manifest themselves as the following description progresses, reference being had to the accompanying drawings wherein:

FIG. 1 is a view showing the improved wiper in side elevation and as applied to a motor vehicle windshield;

FIG. 2 is a detailed elevation of the squeegee embodied flexible frame member, parts being shown in section;

FIG. 3 is a detail sectional view more clearly showing the arm attachment;

FIG. 4 is a fragmentary plan view of the wiper, with parts illustrated in section;

FIG. 5 is a longitudinal sectional view through a portion of the wiper depicting the manner of interlocking one of the suspension links to the flexible frame member;

FIG. 6 is a transverse sectional view therethrough about on line 6—6 of FIG. 5; and FIG. 7 is a fragmentary exploded view in perspective showing the interfitting relation of the suspension links and their supporting, arm attaching clip.

Referring more particularly to the drawings, the numeral 1 designates a wiper actuating shaft on which is fixed a wiper arm having a mounting section 2 and a blade carrying section 3 pivotally connected to the section 2 as by a pin 4. The blade carrying section is urged toward the windshield surface 5 by a flat spring 6 reacting against a supporting part 7 on the mounting section 2. The outer end of the arm is formed with a curved tongue 8 adapted to be received within a socket 9 formed in a mounting clip 10 where it is interlocked by a keeper lug 11 on the clip engaging behind a lug 12 on the tip end of the tongue 8. The clip is shown herein as being hollow and formed of two complemental sections secured together by rivets 13, and contained within the shell-like sections are a pair of complemental rubber blocks 14 in which the socket 9 is formed, the arm tongue 8 fitting the socket and having its lug 12 normally urged into locking relation with the keeper lug 11 by the rubber. Each clip section carries a part of the divided keeper lug 11 and also the respective parts of a pair of divided sustaining spacer sleeves 15 through which the rivets 13 extend. These divided parts 11 and 15 give support to the side walls of the hollow clip and also provide a means by which the individual rubber block sections are held in position by being fitted thereover.

The mounting clip 10 is also formed with a tunnel 16 extending therethrough with the side walls of the tunnel being formed with opposed lugs 17. Thus each clip section is formed with a groove in which a pair of spaced lugs 17 is arranged on one wall thereof, and interlocked with these lugs prior to assembling the clip sections together are the inner ends of a pair of oppositely extending suspension links 18 so that when the rivets 13 are applied the blade mounting clip, which is readily detachable from the wiper carrying arm after first disengaging the lug 12 from the keeper 11, has the oppositely extending arms or links 18 forming therewith a rigid unit.

The outer ends of the suspension links are interlocked with the wiping element or blade 19 which interlock is preferably secured by the anchorage of the adjacent ends of the links within the mounting clip. To this end the outer terminals of the suspension links are shaped to provide hooks 20 for engaging beneath cross bars 21 on mounting ears 22, the latter having opposed channel side flanges or jaws 23 of channeled form which slidably embrace the blade 19. In order to hold the mounting ears from sliding displacement along the wiping blade 19 the terminal hooks 20 are provided with depending lugs 24 for engaging in sockets 25 in the blade. These sockets extend into a reinforcing frame member 26 which is herein illustrated as being of spring leaf construction the alternate leaves of which are offset lengthwise of the blade and secured together by a rivet 27 passing through their inner overlapping ends, as shown more clearly in FIG. 2. The spring leaf formation provides a flexible strip-like member serving to conform the wiping edge of the rubber body of the blade to the windshield surface, such body being preferably hollow or tubular to enable telescopic placement of the leaf spring therein and to form therewith a flexible squeegee unit.

The several parts of the wiper are interlockingly assembled by first positioning the chambered ears 22 over the sockets 25 in the blade. Thereafter the hooked terminals of the suspension links 18 are individually inserted in the ear chambers and engaged beneath the cross bars 21 as transverse bearings, being swung downwardly in this operation from the dotted position in FIG. 5 to the full lined position therein. This swinging movement brings the lugs 24 into the sockets 25. Finally, the clip sections are interlocked with the adjacent inner ends of the suspension arms by engaging the lugs 17 in the marginal notches 28. Thus engaged, the clip sections are fastened together by the rivets 13.

The entire wiper assembly suspends the wiper blade for freedom of flexure throughout to enable the wiping edge 29 being conformed to surfaces of varying curvatures and contours. The mounting clip 10 locks the several parts of the assemblage in their operative relationship and permanently secures them together in a manner to permit the wiping edge acting efficiently. The mounting members or ears 22 loosely pivot or rock upon the hooks 20 as bearings with the result that the blade is suspended at spaced points for a loose and free pivotal action about the opposite ends of the bridge structure as provided by the links and mounting clip 10. Preferably, the links are rather stiff and possessed of little inherent resiliency. However, by increasing their resiliency it is possible to detach the wiping blade through a simple flexing of the latter as well as of the suspending arms to enable the parts assuming the relation indicated by the dotted showing in FIG. 5. The member 26 serves in the capacity of a tension member to give proper backing support for the wiping edge of the blade as it conforms to the surface contour of the windshield.

The blade 19 and its flexible reenforcing backing 26 of strip design constitute a squeegee unit in which the flexible and nonextensible backing has greater width than thickness to give lateral stability to that portion of the squeegee unit between the spaced mounting members 22 while enabling such portion to have surface-conforming flexibility. The mounting members serve as supporting rockers or holders for the backing strip 26, the latter being free to slide in and out in the guiding channels of the flanges 23 that straddle and slidably embrace the unit during surface-conformance of the wiping edge to the windshield surface. Each rocker 22 extends lengthwise of the flexible backing in opposite directions from its transverse mounting pivot 21, and their straddling flanges 23 that engage about the opposite side margins of the backing serve to provide sliding support for the latter at points spaced inwardly and outwardly of transverse pivot 21. The flexible backing strip may be said to act in the capacity of a spline to maintain its supporting holders in coplanar relation with each other as well as with the bridge, and since it slidably interlocks with each holder at points on opposite sides of the pivot 21 the backing will tend to resist any twisting tendency in the holder, about an axis normal to the glass surface, as the wiper is moved sideways thereover.

The comparatively long medial portion of the flexible backing is given intermediate surface-conforming support immediately beneath the bridge 10, 18, by the inner ends of the rockers, such inner ends playing up and down and slidably receiving and paying out the backing lengthwise. By means of the rockers, the flexible backing will follow a surface contour of blended radii in a practical manner, permitting the inner one of the two rockers to ride upon a substantially flat area while the outer holder rocks to conform the wiping edge to a sharper curvature. The flexible backing strip, therefore, serves to tie together its rockable holders 22 into a pyramidal relation with the pressure distributing bridge in which the flexible backing constitutes the base that is slidably interlocked with the rockable holders.

The foregoing description has been given in detail for ease of understanding and without thought of limitation since the inventive principles involved are capable of assuming other physical embodiments without departing from the spirit of the invention and the scope of the appended claims.

What is claimed is:

1. A windshield wiper comprising a wiping body, a pair of links arranged end to end and having means at their remote ends interlocked with the body upon relative movement with respect to the body to support the same at spaced points, and an arm attaching clip coupling the adjacent ends of the links together against such relative movement for securing the interlocking connections between the outer ends and the body.

2. A windshield wiper having a wiping body, a pair of links arranged end to end and having hook shaped outer ends interlocked with the wiping body upon angular movement relative to the body to support the same at spaced points, and an independent mounting clip coupling together the inner ends of the links for holding the latter from such relative movement to secure the hooked ends so engaged with the body.

3. A windshield wiper having a wiping body, a mounting clip therefor, and a pair of links in end to end relation and having their outer ends interlocked to and suspending the body, said clip having complemental sections interlockingly embracing the adjacent inner ends of both links to hold the links so interlocked.

4. A windshield wiper having a wiping body, a mounting clip therefor, and a pair of links suspending the body from the clip, one link having a part hooked into engagement with a transverse bearing on the body upon relative swinging movement, and said clip connecting the opposite ends of the links together for holding said one link from swinging movement tending to unhook the one link from the body.

5. A windshield wiper having a wiping body, a mounting clip therefor, and outwardly extending arms suspending the body from the clip, the outer ends of the arms terminating in hooks which are engaged in recesses in the body upon relative movement between each arm and the body, and said clip serving to hold the arms against such relative movement.

6. A windshield wiper having a wiping body formed with spaced recesses, a mounting clip for the body, and a pair of links each having a terminal portion at one end interlockingly received in the respective one of the body recesses, each link being attached to the body by and upon relative movement therebetween, the opposite ends of the links being coupled together by said mounting clip to hold the links against such relative movement.

7. A windshield wiper having a flexible wiping blade provided with a wiping edge and incorporating a flexible backing tension member to give sustaining support to the wiping edge, a mounting clip, and a pair of suspension links supporting the body from the clip, each link having its outer end detachably interlocked with the body to provide spaced points of support for the latter, such interlock comprising cooperating parts on the link and body interengaging one another by and during relative angular movement therebetween, and said mounting clip having means coupling the opposite ends of the links together to hold them against such relative movement whereby to lock the entire assemblage in their operative relationship.

8. A windshield wiper having an elongated body with a wiping edge along one margin and a recess in its back, a mounting ear slidable on the back over the recess, and an arm having a hook shaped terminal engageable beneath the ear by a swinging movement toward the body, the hook shaped terminal having an oppositely extending lug on its back engageable in the back recess during such swinging movement of the arm for holding the ear against sliding on the body and thereby securing the mounting ear in a position to hold the lug interlocked with the body.

9. A windshield wiper having an elongated body with a wiping edge along one margin and a recess in its back, a mounting ear slidable on the back over the recess, an arm having a hook shaped terminal engageable beneath the ear by a swinging movement toward the body, the hook shaped terminal having an oppositely extending lug on its back engageable in the back recess during such swinging movement of the arm for holding the ear against sliding on the body and thereby securing the mounting ear in a position to hold the lug interlocked with the body, and means securing the arm against reverse swinging movement from the body to maintain the lug interlocked therewith.

10. A windshield wiper comprising a squeegee unit having a flexible elongated wiping body and a flexible backing member therefor of greater width than thickness to give flexible support to its wiping edge for conforming it to the surface being wiped while affording lateral support to the body against sidewise flexing, a pair of elongate mounting members each having rigidly related end portions formed with opposed guiding channels slidably embracing the opposite sides of the unit about the opposite side marginal edges of the backing member and supporting the backing member for so flexing, each mounting member having a transverse bearing medially its length, an arm attaching member, and suspension arms extending in opposite directions from the attaching member, each arm pivotally engaged with a respective transverse bearing for suspending the wiping body for flexing in accordance with the contour of the surface being wiped.

11. A windshield wiper comprising an elongate flexible wiping blade, a flexible reenforcing backing therefor of strip design having greater width than thickness for giving lateral support thereto against sidewise flexing while yielding in surface-conforming flexure, an elongate bridge arranged lengthwise over the back of the wiping blade for distributing the spring pressure of an actuating arm thereto, and a rockable holder at each end of the bridge pivotally connected thereto for rocking up and down about a transverse axis during surface-conforming movement, each holder having end portions on opposite sides of its pivot axis rigidly joined to one another and both embracing the adjacent end portion of the flexible backing and slidably supporting it for such flexure inwardly and outwardly of the transverse axis.

12. A windshield wiper comprising a squeegee unit in the form of an elongate flexible body having a wiping edge and a flexible nonextensible backing member of greater width than thickness with the greater dimension extending crosswise of the body, relatively independent rockers arranged in spaced relation over the back of the unit in slidable embrace therewith to support the same for surface conformance, and an arched pressure-distributing bridge having its opposite ends pivotally connected to intermediate points on the rockers, each rocker being a rigid unit including on each end unit-straddling portions with opposed recesses slidably receiving opposite side marginal edge portions of the backing member for holding the latter operative for surface-conforming flexure, said unit-straddling portions providing spaced points of guiding support for the backing member inwardly of the end pivots.

13. A curved windshield wiper comprising a squeegee unit having an elongate blade flexible for conforming to the windshield surface and an elongate flexible backing therefor having greater width than thickness for imparting a surface-conforming flexibility and lateral rigidity to the unit, a pressure distributing bridge extending lengthwise over the back of the unit and having an arm attaching portion, and a pair of relatively independent jaw forming rockers each pivotally connected intermediate its ends to a respective end of the pressure distributing bridge and having on its opposite ends rigidly fixed and rigidly related unit-straddling jaws with opposed guiding recesses slidably receiving longitudinal side marginal edge portions of the flexible backing to position it for such surface conforming flexibility.

14. A windshield wiper comprisng a squeegee unit having an elongate flexible body having a wiping edge and a flexible nonextensible backing of greater width than thickness, spaced elongate pressure distributing rockers, and a pressure distributing bridge provided with arm attaching means and having its opposite ends each pivotally connected to a bearing in a respective rocker intermediate its length for rocking about a transverse axis, each rocker being a rigid body and including backing-straddling parts with opposed recesses slidably receiving the opposite side margins of the backing to constitute a guiding support therefor inwardly the end pivots and at one end of the medial portion thereof for play of the backing in and out as the squeegee unit flexes in surface conformance, said straddling parts being rigidly related to the respective rocker bearing and coacting with the backing solely from the bearing to resist rotational displacement of the latter about its longitudinal axis as the wiper is moved laterally on a windshield surface.

15. A windshield wiper comprising a squeegee unit having an elongate flexible body having a wiping edge and a flexible nonextensible backing of greater width than thickness, spaced elongate pressure distributing rockers, and a pressure distributing bridge provided with arm attaching means and having its opposite ends each pivotally connected to a respective rocker intermediate its length for rocking about a transverse axis, each rocker being a rigid body and including backing-straddling parts with opposed recesses slidably receiving the opposite side margins of the backing to constitute a guiding support therefor inwardly between the end pivots and at one end of the medial portion thereof for play of the backing in and out as the squeegee unit flexes in surface conformance, said straddling parts being rigidly related to the respective rocker bearing and coacting with the backing solely from the bearing to resist rotational displacement of the latter about its longitudinal axis as the wiper is moved laterally on a windshield surface, the unsupported area of the backing strip suspended beneath the bridge by the inner ends of the rockers being of greater longitudinal dimension than that of one of the areas of the said backing strip carried by a rocker at one side of its pivotal suspension point on the bridge, with one point of lateral guidance extending inwardly and the opposite point of lateral guidance extending outwardly from the pivotal suspension point.

16. A windshield wiper comprising a wiper unit having an elongate flexible body with a wiping edge and a flexible backing member therefor that is coextensive in length with the wiping edge, or substantially so, and has greater width than thickness for providing flexible surface-conforming support to the body with lateral rigidity, a pressure-distributing bridge arched longitudinally over the back of the wiper unit for permitting the latter to flex upwardly thereinto between the opposite ends of the bridge, and a pressure distributing rocker for the wiper unit interposed between the latter and one end of the bridge and rockably supporting the wiper unit, said rocker pivoting about a transverse axis and having one end extending beneath the bridge to afford an intermediate point of support for the medial portion of the wiper unit to follow its flexing, said one end of the rocker straddling the backing member in sliding embrace and having parts overlying and underlying as well as extending about the opposite side margins of the backing member to hold the latter operative against rotational displacement for insuring such lateral rigidness to the medial portion of the backing member while permitting the latter to play in and out lengthwise within the sliding embrace for accommodating the flexing beneath the arched bridge.

17. In a wiper for use on windshields of varying curvatures, a wiping blade and a mounting structure therefor comprising an elongate pressure distributing bridge connectible to an actuating arm, a rockable holder for each end of the bridge pivoted intermediate its ends to a respective end of the bridge for rocking about a transverse axis, a flexible backing strip slidably connecting the two rockable holders to have in and out endwise guided movement thereon and to permit each of the rockable holders to rock and the strip to flex toward and from the surface to conform the mounting structure and the strip to the variable contours of a curved windshield to maintain the said blade in contact with the windshield, said blade having a major part supported by the strip between the rockable holders and permitting one of the rockable holders to be independently rocked to permit the blade to maintain contact on a surface having a substantially flat plane, said strip through its unsupported medial section furnishing an elongate flexible span extensible and contractible in the opposed guiding rockable holders to assume a substantially continuous line of uninterrupted blade contact from a substantially flat surface onto a surface differently contoured.

18. A windshield wiper unit comprising an elongated resilient flexible body having a back portion and a wiping edge conformable to a surface to be wiped, a pair of transversely aligned grooves formed in the body extending substantially throughout the length thereof and positioned between said back portion and said wiping edge, elongated backing means flexible in a plane substantially perpendicular to the surface to be wiped and substantially inflexible in a plane at right angles to said first mentioned plane, said backing means having a pair of longitudinally extending edges positioned in said pair of transversely aligned grooves, in combination with a superstructure, said superstructure including spaced apart integral clamp means having their end portions partially surrounding parts of said back portion and said backing means for retaining said backing means in lateral engagement with said grooves, the end portions of each of said clamp means being longitudinally rigidly aligned with each other, and all said clamp means having longitudinal sliding movement with respect to said unit, whereby said unit in adjusting to surface curvature is free to slide with respect to all clamp means, and means for applying pressure at spaced apart points to said unit to conform the wiping edge thereof to the surface being wiped, said pressure applying means including an elongated bridge member rockably connected adjacent its ends with said clamp means substantially medial the ends of each of the latter, said unit intermediate said clamp means providing a free medial span capable of elongation in conforming to irregular curvatures by lengthwise movement of said unit in said clamp means.

19. A windshield cleaner as defined in claim 18 further including means for preventing displacement of said body and said backing means from said clamp means.

20. A withshield wiper having a flexible blade with a flexible elongate backing strip of greater width than thickness to give surface conforming support to the blade, a pair of elongate rockable mounting members each having oppositely extending end portions with opposed terminal seats, the opposed terminal seats on one end portion being aligned with and rigidly related to the opposed terminal seats on the opposite end portion of the respective mounting member, the opposed terminal seats of each end portion straddling and slidably embracing the blade about the opposite side marginal edges of the backing strip, each seat having a part overlying and underlying a respective side marginal edge portion of the backing strip to apply depressive and lifting forces to the opposite side marginal edges thereof as the wiper is moved back and forth sideways, each mounting member having a transverse bearing intermediate its ends, and a bridge having opposite ends pivoting in the transverse bearings, the adjacent end portions of the two mounting members being spaced apart to define an independently operable contour-responsive medial span therebetween.

21. A windshield wiper unit comprising an elongated resilient flexible body having a back portion and a wiping edge conformable to a surface to be wiped, elongated backing means flexible in a plane substantially perpendicular to the surface to be wiped and substantially inflexible in a plane at right angles to said first mentioned plane, in combination with a superstructure, said superstructure including spaced apart integral clamp means having their end portions partially surrounding parts of said back portion and said backing means for retaining said backing means in engagement with said body, the end portions of each of said clamp means being longitudinally rigidly aligned with each other, and all said clamp means having longitudinal sliding movement with respect to said unit, whereby said unit in adjusting to surface curvature is free to slide with respect to all clamp means, and means for applying pressure at spaced apart points to said unit to conform the wiping edge thereof to the surface being wiped, said pressure applying means including an elongated bridge member rockably connected adjacent its ends with said clamp means substantially medial the ends of each of the latter.

22. A windshield wiper unit comprising an elongated resilient flexible body having a back portion and a wiping edge conformable to a surface to be wiped, elongated backing means flexible in a plane substantially perpendicular to the surface to be wiped and substantially inflexible in a plane at right angles to said first mentioned plane, in combination with a superstructure, said superstructure including spaced apart integral clamp means having their end portions partially surrounding parts of said back portion and said backing means for retaining said backing means in engagement with said body, the end portions of each of said clamp means being longitudinally rigidly aligned with each other, and all said clamp means having longitudinal sliding movement with respect to said unit, whereby said unit in adjusting to surface curvature is free to slide with respect to all clamp means, and means for applying pressure at spaced apart points to said unit to conform the wiping edge thereof to the surface being wiped, said pressure applying means including an elongated bridge member rockably connected adjacent its ends with said clamp means substantially medial the ends of each of the latter, said unit intermediate said clamp means providing a free medial span capable of elongation in conforming to irregular curvatures by lengthwise movement of said unit in said clamp means.

23. A windshield wiper unit comprising an elongated resilient flexible body having a back portion and a wiping edge conformable to a surface to be wiped, a pair of transversely aligned grooves formed in the body extending substantially throughout the length thereof and positioned between said back portion and said wiping edge, elongated backing means flexible in a plane subsantially perpendicular to the surface to be wiped and substantially inflexible in a plane at right angles to said first mentioned plane, said backing means having a pair of longitudinally extending edges positioned in said pair of transversely aligned grooves, in combination with a superstructure, said superstructure including spaced apart integral clamp means having their end portions partially surrounding parts of said back portion and said backing means for retaining said backing means in lateral engagement with said grooves, the end portions of each of said clamp means being longitudinally rigidly aligned with each other, and all said clamp means having longitudinal sliding movement with respect to said unit, whereby said unit in adjusting to surface curvature is free to slide with respect to all clamp means, and means for applying pressure at spaced apart points to said unit to conform the wiping edge thereof to the surface being wiped, said pressure applying means including an elongated bridge member rockably connected adjacent its ends with said clamp means substantially medial the ends of each of the latter.

References Cited

UNITED STATES PATENTS

| | | | |
|---|---|---|---|
| 2,596,063 | 4/1952 | Anderson | 15—245 |
| 2,417,575 | 3/1947 | Thomson | 15—250.7 |
| 2,265,551 | 12/1941 | Steccone | 15—245 |
| 1,510,509 | 10/1924 | Stadeker | 15—250.7 X |
| 1,953,635 | 4/1934 | Rose | 15—250.7 |
| 2,095,396 | 10/1937 | Nielsen | 15—250.7 |
| 2,149,037 | 2/1939 | Zaiger | 15—250.7 |

FOREIGN PATENTS

| | | |
|---|---|---|
| 820,156 | 7/1937 | France. |

CHARLES A. WILLMUTH, *Primary Examiner.*

E. L. MORSE, SIDNEY JAMES, *Examiners.*

JAMES C. HUNDLEY, *Assistant Examiner.*